United States Patent

[11] 3,616,345

[72] Inventor Hendrikus Josephus Antonius Van Dijk
Emmasingel, Eindhoven, Netherlands
[21] Appl. No. 708,306
[22] Filed Feb. 26, 1968
[45] Patented Oct. 26, 1971
[73] Assignee U.S. Philips Corporation
New York, N.Y.
[32] Priority Feb. 25, 1967
[33] Netherlands
[31] 6,703,013

[54] METHOD OF MANUFACTURING SEMICONDUCTOR DEVICES IN WHICH A SELECTIVE ELECTROLYTIC ETCHING PROCESS IS USED
7 Claims, 13 Drawing Figs.

Figure 1:
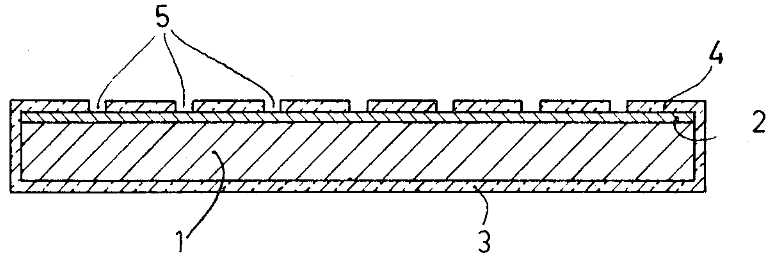

[52] U.S. Cl. .......... 204/143 GE
[51] Int. Cl. .......... H01l 7/52
[50] Field of Search .......... 204/143 G, 143 GE

[56] References Cited

UNITED STATES PATENTS

| | | | |
|---|---|---|---|
| 3,265,599 | 8/1966 | Soonpa .......... | 204/143 |
| 3,418,226 | 12/1968 | Marinace .......... | 204/143 |

*Primary Examiner*—John H. Mack
*Assistant Examiner*—Sidney S. Kanter
*Attorney*—Frank R. Trifari ABSTRACT: A method of manufacturing semiconductor devices comprising a thin film of single crystal silicon. In this process, the surface of one side of a plate-shaped single crystal of silicon substrate of $N^+$ conductivity having a resistivity not exceeding 0.01 ohm-cm. is provided with at least one zone of epitaxially deposited silicon the thickness of which is small in comparison with the substrate and which forms a boundary with the substrate having a resistivity of at least 0.1 ohm-cm. This body is then subjected to a selective electrolytic etching treatment in which the substrate material is removed at least over a large area, the etching action stopping substantially at the locations at which the material of higher resistivity becomes exposed.

INVENTOR.
HENDRIKUS J.A. VAN DIJK
BY
Frank R. Trifari
AGENT

INVENTOR.
HENDRIKUS J.A. VAN DIJK
BY
Frank R. Trifari
AGENT

HENDRIKUS J.A. VAN DIJK
INVENTOR.
BY
Frank R. Trifari
AGENT

INVENTOR.
HENDRIKUS J.A. VAN DIJK
BY
Frank R. Trifari
AGENT

INVENTOR.
HENDRIKUS J.A. VAN DIJK
BY
Frank R. Trifari
AGENT

METHOD OF MANUFACTURING SEMICONDUCTOR DEVICES IN WHICH A SELECTIVE ELECTROLYTIC ETCHING PROCESS IS USED

The invention relates to a method of manufacturing semiconductor devices in which at the surface of one side of a body of semiconductor material at least one zone is formed which extends at least along part of the surface, said zone consisting, at least at the boundary with the underlying semiconductor material, of the same semiconductor material as that of the underlying material but having different conductivity properties, said underlying material being then removed by a selective electrolytic etching process, while retaining the said zone at least partly. The invention further relates to semiconductor devices manufactured by said method.

In bodies of semiconductor material having a PN junction it is known to remove material of one type, preferably by an electrolytic etching process, up to the said PN junction, the etching action being discontinued at said PN junction. In this case a voltage in the reverse direction may be applied across the PN junction, each of the parts being connected on either side of the PN junction to an electric connection. It is also known to provide only the part with the material to be etched away with a connection, the required voltage being applied between said connection and an electrode in the etching bath, and the etching action not proceeding further than PN junction.

It is known further to use such a selective electrolytic etching process to etch away from a body of a material of a given conductivity type having on one side a surface zone of the opposite conductivity type all the material of the first-mentioned conductivity type as a result of which the original body is restricted to the said zone of the opposite conductivity type. This zone may originally be obtained by diffusion of a suitable impurity or by providing doped semiconductor material by means of an epitaxial process.

It has now been found that the method in which the electrolytic etching is restricted to only one side of a PN junction of a semiconductor body with the use of only one bias connection on said body can be used with difficulty for etching away N-type material while maintaining the P-type material, whereas the method can readily be used for etching away P-type material while retaining N-type material. It has furthermore been found that in the latter case the resistivity of the N-type material may preferably not be too low and that the upper limit for the voltage to be used for the electrolytic process for retaining the N-type material is higher according as the resistivity of the N-type material is higher. For the above-mentioned selective electrolytic etching process, for manufacturing thin plate-shaped bodies of semiconductor material, one is restricted to the use of substrate of P-type conduction on which the N-type zone is provided which ultimately will form the material of the thin semiconductor body to be manufactured.

One of the objects of the present invention is to enable also the use of bodies of N-type semiconductor material as a substrate for the thin region to be manufactured. The invention uses the fact that with suitable choice of the voltage used during the electrolytic etching process, N-type semiconductor material having a low resistivity is etched away much more rapidly than the same semiconductor material if likewise of N-type, but having a higher resistivity. According to the invention, the method of tee type mentioned in the preamble is characterized in that at least at the boundary in question both the material of the zone and the underlying material are N-type but in which, at the relatively boundary, the N-type semiconductor material adjoining the zone has a higher conductivity than the material of the zone at said boundary, a voltage being applied during the electrolytic etching treatment at which the material of the zone at the boundary is substantially not dissolved or is dissolved comparatively slowly relative to the semiconductor material adjoining the zone. If, in fact, the etching speed at which two N-type materials of different resistivities and consisting of the same semiconductor material are dissolved electrolytically, the etching speed of the material having the lower resistivity, rapidly increases from a given voltage onwards, while the etching speed of the material having the higher resistivity does not increase substantially and/or remains at a comparatively low level.

With the method according to the invention it is possible to obtain simultaneously a division in separate zone-portions in which a number of such zone-portions are formed on one side of the semiconductor body and the semiconductor material is doped between said portions in such manner that said material becomes either P-type or becomes so strongly N-type that it is also etched away in the same etching process. Such P-type or strongly N-type separation-regions which separate the said zone-portions from each other, can be formed in known manner by diffusion of suitable impurities.

It is further possible to form doped regions by diffusion of impurities in the zone or zone-portions which regions are so shallow that a zone region consisting of the original zone material of high-ohmic N-type is retained at the boundary with the substrate material as a result of which the formed shallow region or regions is or are retained during the elctrolytic etching treatment. In this manner essential parts of semiconductor electrode systems can previously be formed in the high-ohmic N-type material in which moreover the possibility exists to provide at the side of the zone, prior to the etching process, other components for the semiconductor device to be manufactured for example, electrically conductive contacts insulating coatings, intercommunication leads and electrical connections.

The method of previously forming shallow diffusion regions may, but need not be combined with the application of separation regions through the entire thickness of the zone. It is for instance possible to obtain a mosaic of shallow diffused regions by normal planar technics as described in British No. 942,406 leaving an integral region of the original zone material. After the etching treatment according to the invention an integral thin plate subsist which might be suitable as a target in a vidicon pickup tube which might receive radiation on the side at which the low-ohmic N-type material was removed by the electrolytic etching treatment and scanned by the electron beam of the side of the shallow regions.

Before carrying out the etching process the side of the zone or zone-portions is in general coated with an insulating material which is preferably resistant to the action of the etching bath. As a result of this, the action of the etching agent can take place only from the surface of the semiconductor body opposite to the said region. The side of the region may be secured to a body, for example, a glass plate, by means of, for example, a suitable cement.

It has been found that by the action of radiation, in particular radiation which is capable of producing photoconductivity in the semiconductor material, the etching away of high-ohmic N-type material can be favored. Preferably the semiconductor material is therefore withdrawn from the action of such a radiation during the etching process. For that purpose the electrolyte etching process is preferably carried out in the dark.

Although the method according to the invention may be applied to germanium and semiconductive compounds, the use of silicon as a semiconductor material has the additional advantage that the surface of the silicon may be passivated at the area as soon as the electrolyte reaches the zone material located at the boundary as a result of which a proceeding very slow etching is even omitted. This passivation occurs in particular when using an electrolyte containing fluorine ions. It is obvious that for that purpose the zone material located at the boundary must preferably have a sufficiently high resistivity while the etching conditions are adapted to the formation of a passivating layer. For the substrate is preferably used N-type silicon having a resistivity of at most 0.01 Ω cm. and for the adjacent material of the zone (portions) is preferably used N-type silicon having a resistivity of at least 0.1 Ω cm.

Within the scope of the present invention numerous variations are possible. For example, prior to the etching treatment grooves may be etched on the side of the zone of high-ohmic N-type material which grooves extend through said zone after which said grooves may be filled, if required, in known manner to obtain insulating separating slots after which the substrate material is removed by the electrolytic etching process and semiconductor islands are obtained having the thickness of approximately the said zone.

In addition, in a platelike semiconductor body of low-ohmic N-type material an adjoining zone of high-ohmic N-type material may be provided on one side and on top of this may be arranged a zone of P-type material and grooves may be etched in the P-type material by means of a suitable masking method, which grooves do not extend through the high-ohmic N-type material. The grooves may be filled in known manner with insulating material and the side with the mutually separated P-type regions may be adhered to an insulating carrier after which the low-ohmic N-type material is dissolved by means of the selective etching process according to the invention. After removal of the insulating carrier the resulting thin N-type layer with the exposed P-type islands may be used, for example, in a target plate of a pickup tube, more especially of the vidicon type.

Figure 2:
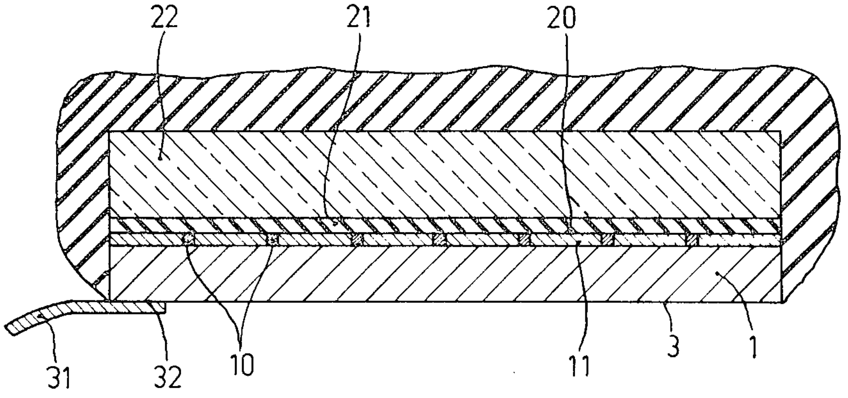
Figure 3:
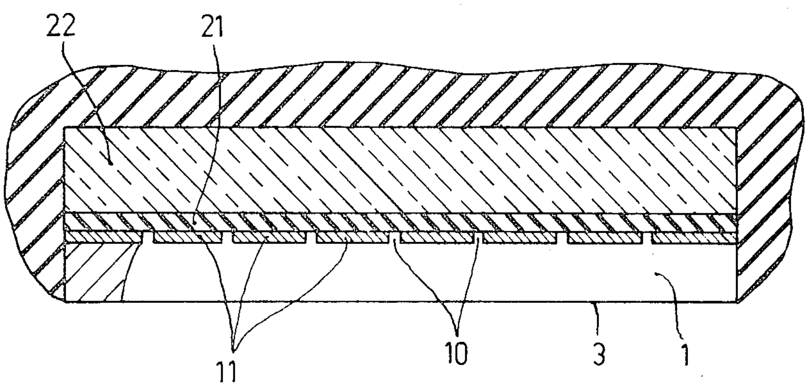

The invention will now be described in greater detail with reference to the accompanying drawings, in which:

FIGS. 1 to 3 diagrammatically show cross-sectional views of successive stages of manufacturing semiconductor islands on a substrate of a semiconductor wafer.

Figure 4:
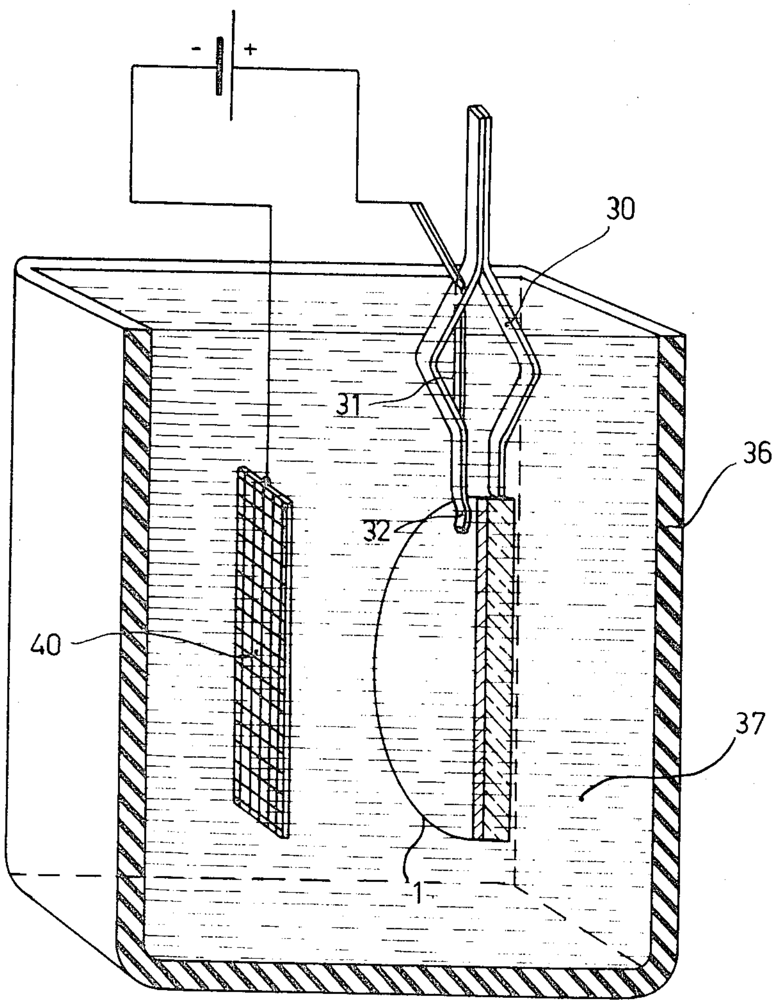

FIG. 4 diagrammatically shows a vertical cross-sectional view of a device for the electrolytic etching of a semiconductor wafer.

FIGS. 5 to 10 diagrammatically show cross-sectional views of details of successive stages of the manufacture of a combination of semiconductor circuit elements built up on a number of mutually separated semiconductor islands on a common substrate.

Figure 11:
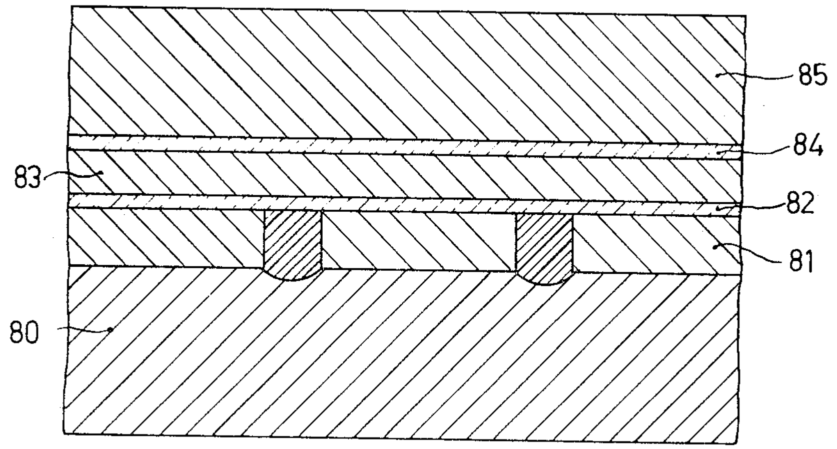

FIG. 11 diagrammatically shows a cross-sectional view of a detail of a semiconductor wafer arranged on a substrate to be divided into thinner parts by electrolytically etching.

Figure 12:
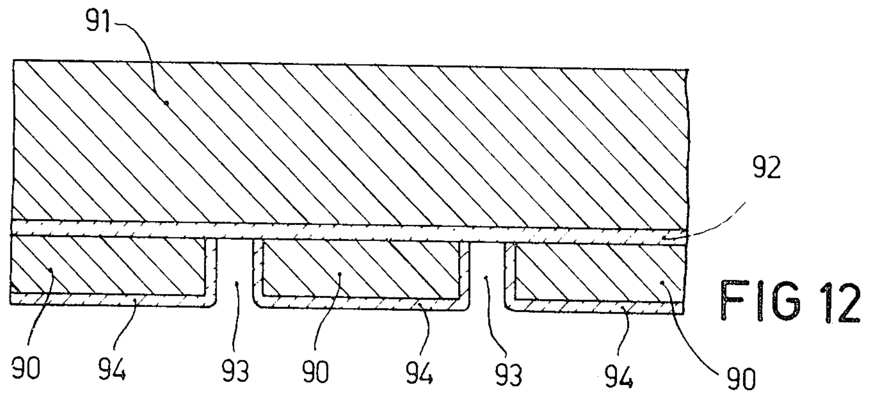
Figure 13:
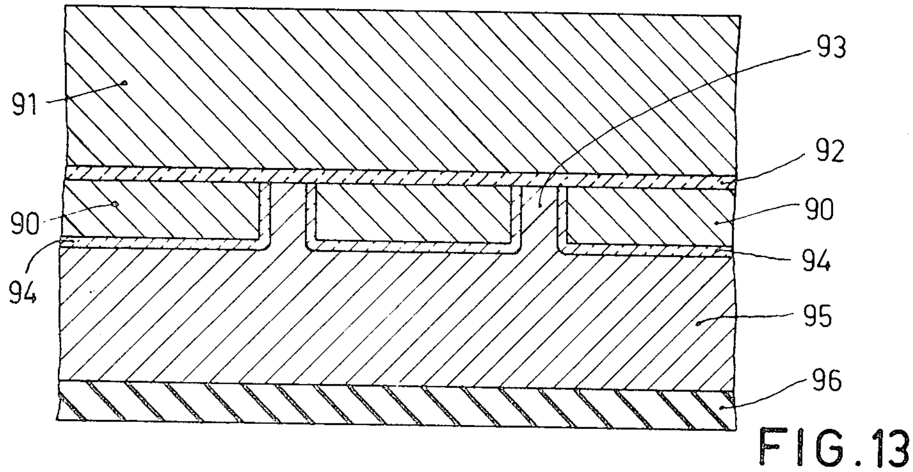

FIGS. 12 and 13 diagrammatically show cross-sectional views of details of successive stages of manufacturing mutually insulated semiconductor islands on a substrate.

EXAMPLE I

FIG. 1 is a vertical cross-sectional view of a disc of arsenic-doped, N-type silicon, thickness approximately 300 microns, diameter 2 cm. The resistivity of the N-type material of the body 1 is 0.007 ohm-cm.. The body is obtained from a rod-shaped single crystal of silicon by sawing at right angles to the longitudinal direction of said crystal, after which the surface is further ground to the above thickness. The body is then pretreated in the conventional manner in which one side is polished with aluminum oxide, grain size approximately 0.05 micron, and etched in gaseous HCl mixed with hydrogen. The disc is heated during the last treatment at approximately 1,100° C.

In known manner a zone 2 is then epitaxially provided on one side of the disc, the material of the layer consisting of N-type silicon having a resistivity of 0.5 ohm-cm. The epitaxial zone 2 may be obtained, for example, by passing a gas mixture of silicon tetrachloride and hydrogen, comprising a small addition of antimony hydride, along the silicon body 1, said body being arranged on a support with its side 3 and heated to a temperature of 1,050° C.

The epitaxial deposition is continued for 10 minutes in which a layer thickness of 10 micron is obtained. By oxidation in moist oxygen at a temperature of 1,100° C, the silicon oxide skin 4 is then formed in which by means of a suitable photoresist method a network of channels 5 is provided. The channels 5 have a width of 20 to 50 microns, and divide the oxide skin in rectangular parts, for example, of a square shape, the sides of which are approximately 350 microns. The body is then subjected to a phosphorus diffusion treatment in which a network of regions 10 of phosphorus-doped silicon having a low resistivity are formed (see FIG. 2). For the said purpose the body is first subjected to the action of gas mixture of nitrogen, oxygen, and $POCl_3$ for 20 minutes at a temperature of 1,100° C. a phosphate glass being formed from which phosphorus is further diffused at 1,120° C. for 16 hours, local regions of low-ohmic N-type silicon being formed throughout the thickness of the epitaxial zone. These regions adjoin the N-type material having the low resistivity of the original semiconductor body 1 as a result of which the epitaxial zone 2 is divided in zone-portions 11 consisting of the N-type material of high resistivity as was provided epitaxially originally. If desired, the oxide skin 4 which was used as a mask for the phosphorus diffusion, may be removed, for example, with a hydrofluoric acid solution obtained by mixing 1 part by volume of concentrated HF solution (50 percent by weight of HF) with 1 part by volume of water.

The resulting semiconductor body is then secured to a glass support 22 with the side 20 by means of a suitable etch resistant and water-repellent cement 21, for example, Canada balsam or colophony, while also the whole glass surface may be coated, for example, additionally with paraffin.

By means of a clip 30 which consists of a synthetic resin which is HF resistant, for example, polymethylmethacrylate, a platinum connection 31 is clamped against the side 3 at a place 32 which is located near the edge of the disclike body (see FIG. 4).

The silicon body is now subjected to a selective electrolytic etching treatment. In this case use is made of an open container 36 consisting of polyethylene in which a liquid electrolyte 37 is provided consisting of dilute aqueous HF solution obtained by mixing one part by volume of concentrated hydrofluoric acid (50 percent by weight) with 10 parts by volume of water. By means of a stirrer (not shown) a good circulation of the electrolyte may be ensured. A platinum electrode 40 is arranged in the bath and consists of platinum gauze of square shape, having a side of 4 cm., secured to a platinum stem which partly lies above the meniscus of the electrolyte and with which the electrode can be connected electrically.

The semiconductor body 1 with the glass plate and the platinum contact with the resilient clip is slowly lowered into the electrolyte in a vertical position with the clip 30 on top and the side 3 facing the platinum electrode 40, a voltage of 12 volt being applied between the platinum contact 31 and the platinum electrode 40 serving as the cathode. The horizontal distance between the platinum cathode 40 and the semiconductor surface is approximately 2 cm. The rate with which the semiconductor body 1 is lowered is 2 mm. per minute. As soon as the platinum contact 31 touches the electrolyte, the remaining part of the semiconductor 5 is immediately immersed. The container is arranged in a dark chamber (not shown) to reduce photoconductive effects which might cause dissolution of the high-ohmic N-type material. The etching rate is approximately 2 microns per minute. As a result of the gradual lowering of the semiconductor wafer in the liquid 37, it is achieved that the etching action begins at the semiconductor parts which are farthest remote from the platinum contact 31. The readily conductive N-type material is not etched away from the side 3. Because the parts which are situated nearest to the connection are subjected later to the electrolytic etching treatment than the parts which are farther remote from the contact, it is prevented that by fully etching the semiconductor material near the contact 31, the electric connection between said contact and parts of the readily conducting N-type material which are located farther away and which would not yet be fully etched off would be interrupted as is described in copending application Ser. No. 707,031, filed Feb. 21, 1968, now U.S. Pat. No. 3,536,600.

When by etching away the N-type material of the original body 1 the electrolyte 37 contacts the epitaxial zone 2, the etching action appears to be restricted to the readily conducting regions 10 obtained by diffusion, while the zone-portions 11 on the side of the electrolyte are coated by a passivating skin which substantially prevents further etching away of the material. When the regions 10 are etched through, mutually separated portions 11 are obtained of an approximately square form having a length and width of approximately 350 microns and a thickness of approximately 15 microns (see FIG. 3).

The resulting square bodies may be further processed in known manner to semiconductor devices. For that purpose the semiconductor body may be detached from the glass substrate by dissolving the adhesive, for example, in the case of Canada balsam or colophony, by dissolving in carbon tetrachloride or chloroform. Although the resulting bodies are extremely thin, they can readily be handled by means of suction pipettes.

Instead of diffusion of a donor to obtain the separation regions 10 to be etched away, it is alternatively possible to locally diffuse acceptors, for example, boron, to obtain P-type separation regions having a high conductivity.

EXAMPLE 2

On one side of a semiconductor disc consisting of arsenic-doped N-type silicon having a resistivity of 0.007 Ω cm. and dimensions as described in example 1, N-type silicon having a resistivity of 0.5 Ω cm. is deposited epitaxially to a layer thickness of 15 microns. With the side where the epitaxial zone is provided the semiconductor disc is adhered to a glass plate by means of a suitable adhesive, for example, colophony or Canada balsam. In the manner described in example 1, the silicon body is now subjected to a selective electrolytic etching treatment, in which in this case also the low-ohmic material of the substrate is dissolved while the high-ohmic epitaxially provided material is maintained. In this manner a thin monocrystalline silicon slice having a uniform thickness of 15 microns, remains adhered to the glass plate.

The slice adhered to the glass plate may further be treated, for example, by dividing it into small slices. For this purpose, an etch resistant masking pattern may be provided on the slice in known manner by using a photoresist method, after which, by means of an etching process in which the semiconductor surface is protected from the action of the etching agent with the exception of linear strips the semiconductor slice is etched through and the division in question is obtained. The individual thin slices which in spite of their low thickness can be handled reasonably, for example, with a suction pipette, may be further processed in known manner, after having been detached from the substrate, for example, by dissolving the adhesive layer and may be subjected, for example to diffusion treatments with the use of masking layers, for example, masking oxide layers or nitride layers.

As a variation to this example regions of different conductivities and conductivity types for the semiconductor devices to be manufactured may be formed in the epitaxial zone by diffusion from the surface opposite to the substrate material and prior to the electrolytic etching treatment for dissolving the substrate, in which, however, the diffusion depths are restricted in order to prevent etching through at the area of the formed shallow diffusion regions during the electrolytic etching treatment. Alternatively insulating layers, for example, a silicon oxide or a silicon nitride coating, and metal connection strips may be provided previously. In addition, a more permanent adhesive, for example, an epoxy resin, may be used and separating the circuit elements from each other and, if desired, making the places accessible for providing external connections to the relative connection strips, may be carried-out afterwards by one or more suitable etching processes.

Figure 5:
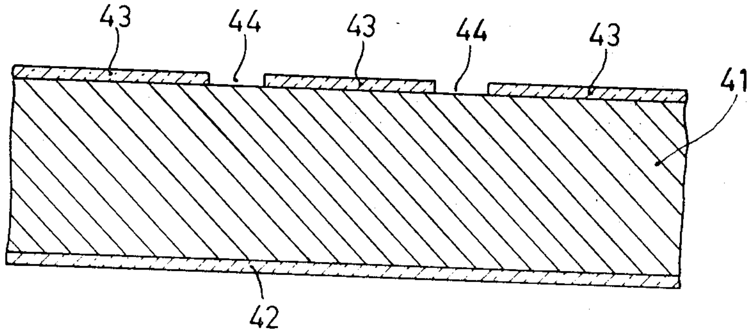
Figure 6:
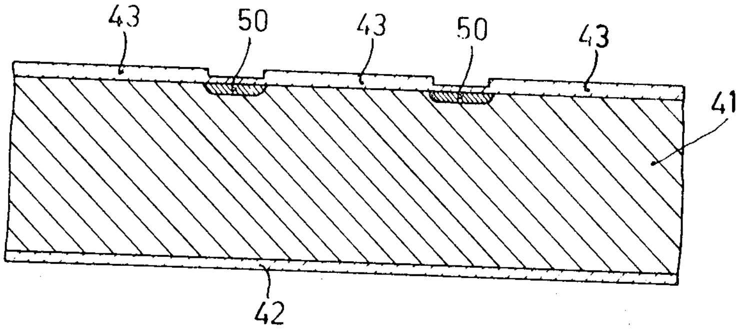
Figure 7:
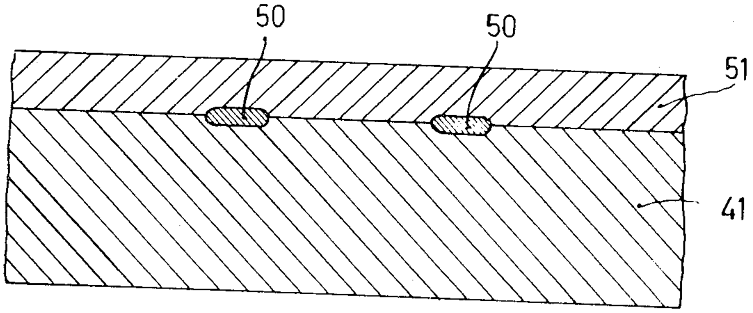
Figure 8:
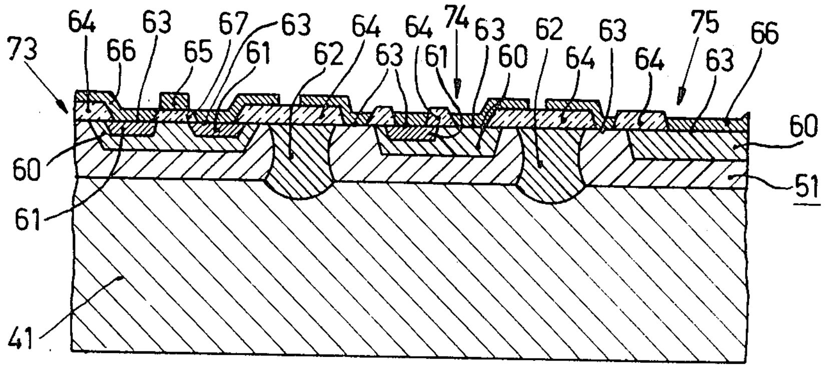
Figure 9:
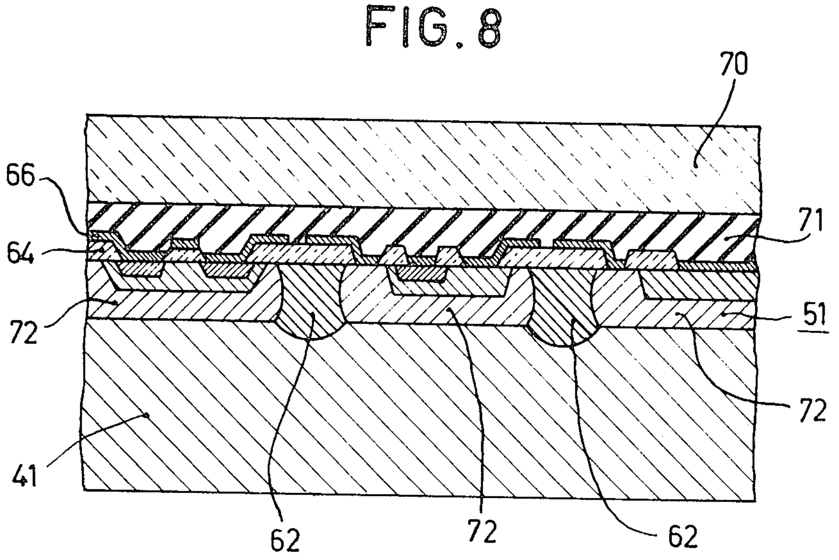
Figure 10:
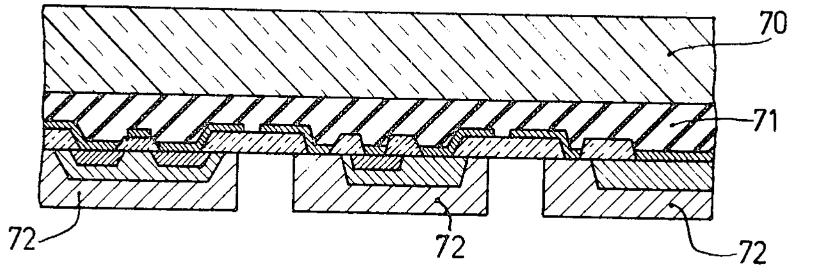

As a variation to example 1, in which a disclike body 41 consisting of arsenic-doped N-type silicon having a resistivity of 0.007 ohm-cm. is used as the starting material, first boron or phosphorus is diffused shallow by at a low temperature, for example, 1,100° C. according to the pattern of the separation regions to be manufactured (see FIG. 5). One side of the disc is fully covered with a silicon oxide coating 42 whereas the other side is locally covered with a silicon oxide coating 43 so that a network of channels is free from said oxide coating while the surface portions enclosed by said channels are covered with the oxide coating 43. The channels may be obtained by means of a conventional photoresist method, in which the portions of the oxide coating to be maintained are covered with an etch resistant masking after which the channels are etched in a manner known as such. In this case shallow regions 50 of silicon doped heavily with boron or phosphorus, respectively, are formed at the area of the separation regions to be manufactured (see FIG. 6). After removing the oxide from the surface of the disc, the silicon body is epitaxially provided with a zone 51 of high-ohmic N-type silicon having a resistivity of 0.5 ohm-cm. on the side which is locally doped with boron or phosphorus, respectively (see FIG. 7). The thickness of the epitaxial zone 51 is, for example, between 10 and 15 microns. By using suitable diffusion masking patterns, regions of different conductivity types are locally formed in the high-ohmic material of the epitaxial zone 51 by means of known diffusion methods, for example, P-conductive regions 60 and N-conductive regions 61 (see FIG. 8). At the area of the separation regions boron or phosphorus, in accordance with the dope chosen in the regions 50, may furthermore be diffused, the boron or phosphorus, respectively, diffusing towards each other both from the surface of the epitaxial zone and from the boundary with the substrate, as a result of which P-conductive or low-ohmic N-conductive separation regions 62 are formed. The oxide coatings formed during the diffusion may wholly or partly be replaced, if desired, by a fresh insulating coating for example, an oxide coating, as is known per se. For providing contacts, windows 63 may be provided in the insulating coating 64 and a suitable metal for example, aluminum be vapor deposited, while in addition on a thin part of the insulating coating capacitatively controlling electrodes 65 and otherwise also metal connection strips may be arranged in known manner. In this manner the semiconductor circuit elements may collectively constitute an integrated circuit. Fig. 8 shows as examples of circuit elements, a field effect transistor 73, an NPN transistor 74, and a diode 75 to show that various circuit elements can be formed on the same side of a wafer as is known per se and is used in manufacturing integrated circuits on a semiconductor body. The nature and the location of the circuit elements shown in FIG. 8, however, are arbitrary and are not given with a view to the manufacture of a special circuit.

It will in general be desirable to manufacture a number of integrated circuits from one disc of the semiconductor material, said integrated circuits being separated afterwards, while in addition the possibility must exist to connect such an integrated circuit. For that purpose, the separation regions between the various integrated circuits may be chosen to be wider, if desired, locally or throughout their length, the connection strips to be provided with contacts, if required, extending towards said widenings, so that said strips may be connected from the side of the semiconductor material which is etched away.

The semiconductor wafer with the various previously manufactured integrated circuits, including the insulating and metallic coatings, is adhered, with the side provided with said coatings, to a glass plate 70 by means of a suitable adhesive 71, for example, in the manner as described in example 1 (see FIG. 9), after which the electrolytic etching treatment as described in example 1 is applied. Both the low-ohmic N-type material of the substrate 41 and the P-type or N-type separation regions 62, respectively, are etched away while the zone-portions 72 bounded by said separation regions and adjoining the substrate 41 and the separation regions 62 only with N-type material of high resistivity are retained (see FIG. 10). The glass plate 70 may now be scratched according to the pattern of slots between the integrated circuits, and the integrated circuits may be separated from one another by breaking. At the edge of the integrated circuits, where the metal below the removed material is exposed, further connections may be secured which, when incorporated in an envelope, may be passed through the envelope.

In this connection it is to be noted that it is not necessary to divide the glass plate but that it is alternatively possible to separate the integrated circuits by careful cutting after which the adhesive with which the wafer is secured to the glass plate can be dissolved as described in example 1.

It has furthermore been found that when an electrolyte is used which consists of dilute hydrofluoric acid, eventually exposed silicon oxide coating, if any, may be attacked. On the contrary silicon nitride which is also known as a material for diffusion masks and for coating the silicon surface is found to be readily resistant to such an action. Therefore, a surface coating of silicon nitride is used preferably at the area of the separation regions to be provided and at least at least at the edges of the zone portions to be separated.

Instead of a readily soluble adhesive, such as the Canada balsam or colophony mentioned in example 1, a more permanent adhesive which is difficult to remove, for example, an epoxy resin, may alternatively be used in the present case.

Instead of adhering the disc to a glass substrate by means of a soluble or insoluble adhesive, the side of the disc 80 having the epitaxial zone 81 which is already provided with a suitable oxide coating 82 (see FIG. 11) or a silicon nitride coating, may be provided with polycrystalline silicon by decomposition of a suitable silicon compound so that a permanent temperature-resistant substrate is formed. If desired, diffusion may be carried out in known manner on the surface of the zone or zone-portions, exposed after the etching treatment, if desired also if already previously diffusion process were applied from the other side. For example, if the zone with the high-ohmic N-type material constitutes an active function in a circuit element, for example, as the collector in a transistor, said zone may be provided with a low-ohmic N-type layer, for example, by diffusion, in order to minimize a horizontal voltage drop. Alternatively, metal layers may be provided on said exposed side, for example, for the last mentioned purpose or for providing contacts.

The polycrystalline silicon may be provided in a sufficient layer thickness to obtain a rigid self-supporting assembly, for example, in a thickness of 100 to 200 microns. The growing time of the silicon is comparatively slow. In the case of growing by decomposition of $SiCl_4$ in the presence of hydrogen at a temperature of the surface to be coated of 1,050° C. the rate of growing is, for example, approximately 1 micron per minute. However, the growth of the polycrystalline silicon 83 may be restricted to a layer thickness of for example, 10 microns, then a glass layer 84 may be provided, for example, by sputtering or by sedimentation of powdered glass, and the polycrystalline silicon 83 may be secured by means of said glass layer 84 to a solid, preferably plate-shaped silicon body obtained, for example, by sawing a silicon body obtained from melted silicon. By heating, the glass may be softened and the connection may be obtained by adhering of the body to the softened glass.

In both cases a temperature-resistant support is obtained, as a result of which it is possible to perform suitable diffusion treatments on the side exposed by etching. As a result of this it is even possible to build up the essential parts of the semiconductor circuit elements to be manufactured on that side of the zone or zone-portions.

If in the etching process no separation slots are etched, the resulting body consists of a thin monocrystalline layer of comparatively large lateral dimensions which is secured to a temperature-resistant support in an insulating manner, in which layer semiconductor circuit elements, for example, for integrated circuits, can be formed by means of known methods, for example, planar methods, which circuits can be insulated from each other, if desired, by the formation of separation regions, for instance obtained by diffusion.

As described above, a number of thin semiconductor monocrystalline "islands" 90 can also be obtained which are connected by means of an insulating oxide or nitride coating 92 to polycrystalline silicon 91. The spaces 93 between the semiconductor islands 90 are in that case open. (see FIG. 12). The free surface of said bodies may then be oxidized or be coated in a different manner with a temperature-resistant oxide or nitride coating 94 which also covers the surface bounded by the channel 93, after which on that side and in the channels 93 polycrystalline silicon 95 is provided (see FIG. 3). This latter material may afterwards serve as a substrate. It is coated with an etching-resistant layer 96 after which the polycrystalline silicon 91 on the other side which was provided previously can be removed by chemically etching, for example, with a known etching liquid of concentrated nitric acid, concentrated hydrofluoric acid, glacial acetic acid and iodine. This etching is continued until the silicon oxide or silicon nitride coating is attained. Then a flatter structure is obtained without open grooves which is particularly suitable for carrying out planar methods for forming semiconductor elements and integrated circuits. The advantage is obtained of an insulation between the various circuit elements.

Naturally many variations are possible without departing from the scope of the present invention.

It is possible, for example, to provide a more flexible support so that a kind of flexible foil is obtained with the semiconductor parts secured thereon.

In addition other compositions of the etching bath may be used. For the selective electrolytic etching of N-type silicon etching baths were, for example, successfully used which consisted of mixtures of one part by volume of concentrated HF (50percent by weight) and 16 parts of a solution of 200 gms. of $NH_4F$ in 100 gms. of water.

Where above in connection with the good or bad or not-at-all-etching away of N-type semiconductor material, in particular N-type silicon, the terms low-ohmic or readily conducting and high-ohmic or poorly conducting, respectively, are used, these terms should be considered with respect to this different behavior during the electrolytic etching and not with respect to the properties in a semicondcutor device.

What is claimed is:

1. A method of manufacturing semiconductor devices comprising a thin sheet of single crystal silicon comprising the steps of providing the surface of one side of a plate-shaped single crystal silicon substrate of $N^+$-type conductivity having a resistivity of at most 0.01 ohm-cm. with at least one zone of epitaxially deposited silicon the thickness of which is small in comparison with the thickness of the substrate, said zone consisting at least at the boundary with the substrate of N-type material having a resistivity of at least 0.1 ohm-cm. subjecting the body to a selective electrolytic etching treatment in which the substrate material is removed at least over a large area the etching action substantially stopping at the locations at which the material of the higher resistivity becomes exposed.

2. A method as claimed in claim 1, in which the epitaxially deposited silicon is N-conductive.

3. A method as claimed in claim 2, in which the surface of the semiconductor material having a resistivity of at least 0.1 ohm-cm. is passivated by contact with the electrolyte.

4. A method as claimed in claim 3 wherein the electrolyte used contains fluorine ions.

5. A method as claimed in claim 2, in which a plurality of zone-portions are formed on one side of the semiconductor body, the semiconductor material between said zone-portions being doped in such manner that said material becomes either P-type or strongly N-type so that it is also etched away in the same etching process.

6. A method as claimed in claim 2, wherein during the etching process the semiconductor material is shielded from the influence of radiation which may generate photoconductivity in the semiconductor material.

7. A method as claimed in claim 6, wherein the etching process is carried out in the dark.

* * * * *